United States Patent [19]

Gechele et al.

[11] 4,245,305

[45] Jan. 13, 1981

[54] DIRECT MEMORY ACCESS CONTROL DEVICE

[75] Inventors: Walter Gechele, Albiano di Ivrea; Vincenzo Casolino, Secondigliano, both of Italy

[73] Assignee: Ing. C. Olivetti & C., S.p.A., Ivrea, Italy

[21] Appl. No.: 971,322

[22] Filed: Dec. 20, 1978

[30] Foreign Application Priority Data

Dec. 30, 1977 [IT] Italy .................. 69952 A/77

[51] Int. Cl.³ .......................................... G06F 13/00
[52] U.S. Cl. ................................................ 364/200
[58] Field of Search ... 364/200 MS File, 900 MS File

[56] References Cited

U.S. PATENT DOCUMENTS

| 3,133,268 | 5/1964 | Avakian et al. ............. 364/900 |
| 3,526,878 | 9/1970 | Bennett et al. ............. 364/200 |
| 3,703,707 | 11/1972 | Bovett ...................... 364/200 |
| 4,053,950 | 10/1977 | Bourke et al. ............. 364/200 |

Primary Examiner—Harvey E. Springborn
Attorney, Agent, or Firm—Schuyler, Banner, Birch, McKie & Beckett

[57] ABSTRACT

In a computer wherein a central processor and at least one peripheral controller have access to a memory, this latter is divided into two simultaneously accessible zones, namely a private zone accessible by the processor and a direct access zone accessible both by the processor and by the peripheral controller. A logic unit synchronizes the controller's access to the direct access zone with the processor's access to the private zone, the controller's access being delayed, if necessary to occur simultaneously with the processor's access. The peripheral controller's access is thereby achieved without interruption of processor operations.

7 Claims, 8 Drawing Figures

FIG.1

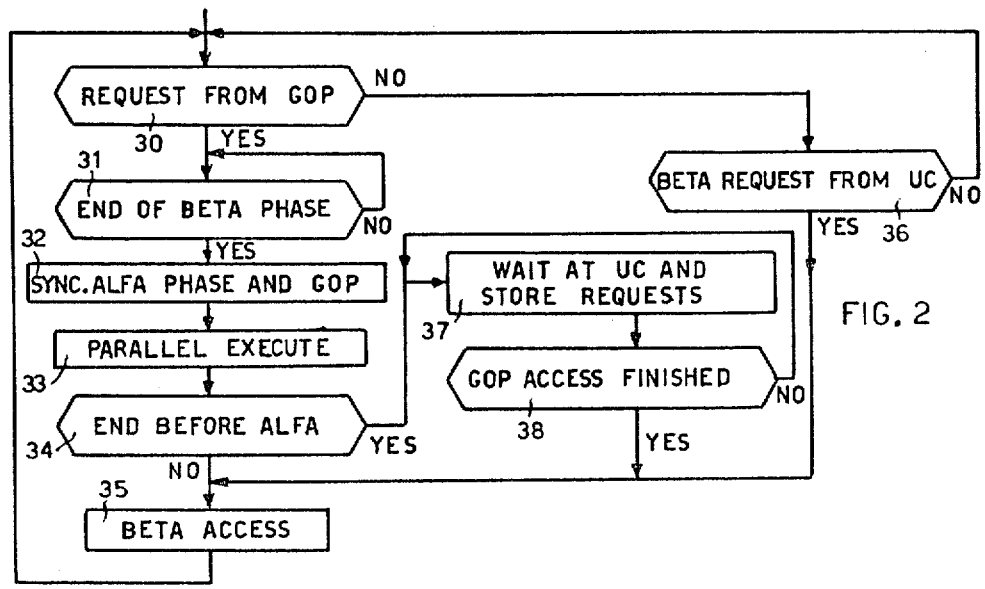
FIG. 2
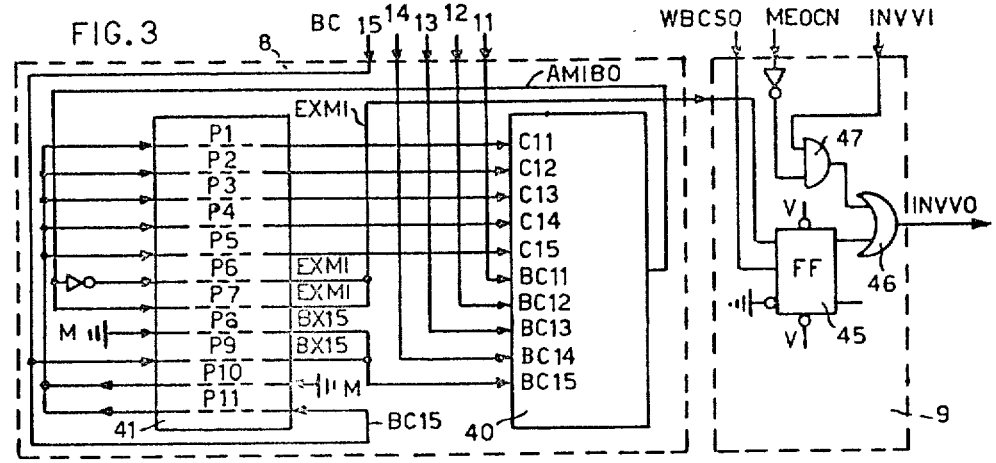
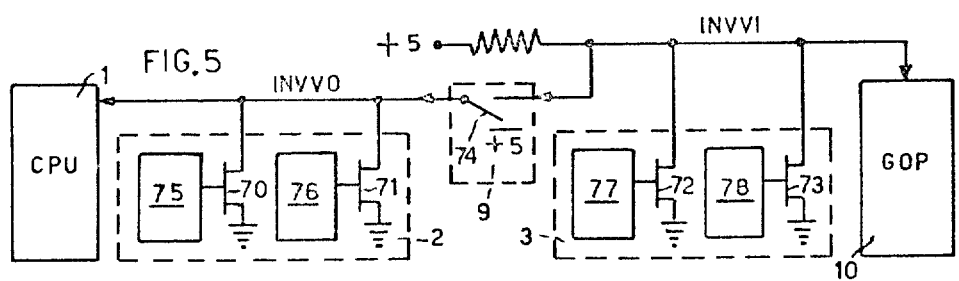

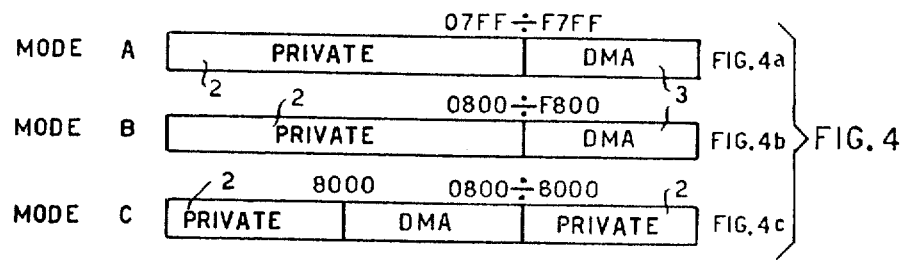
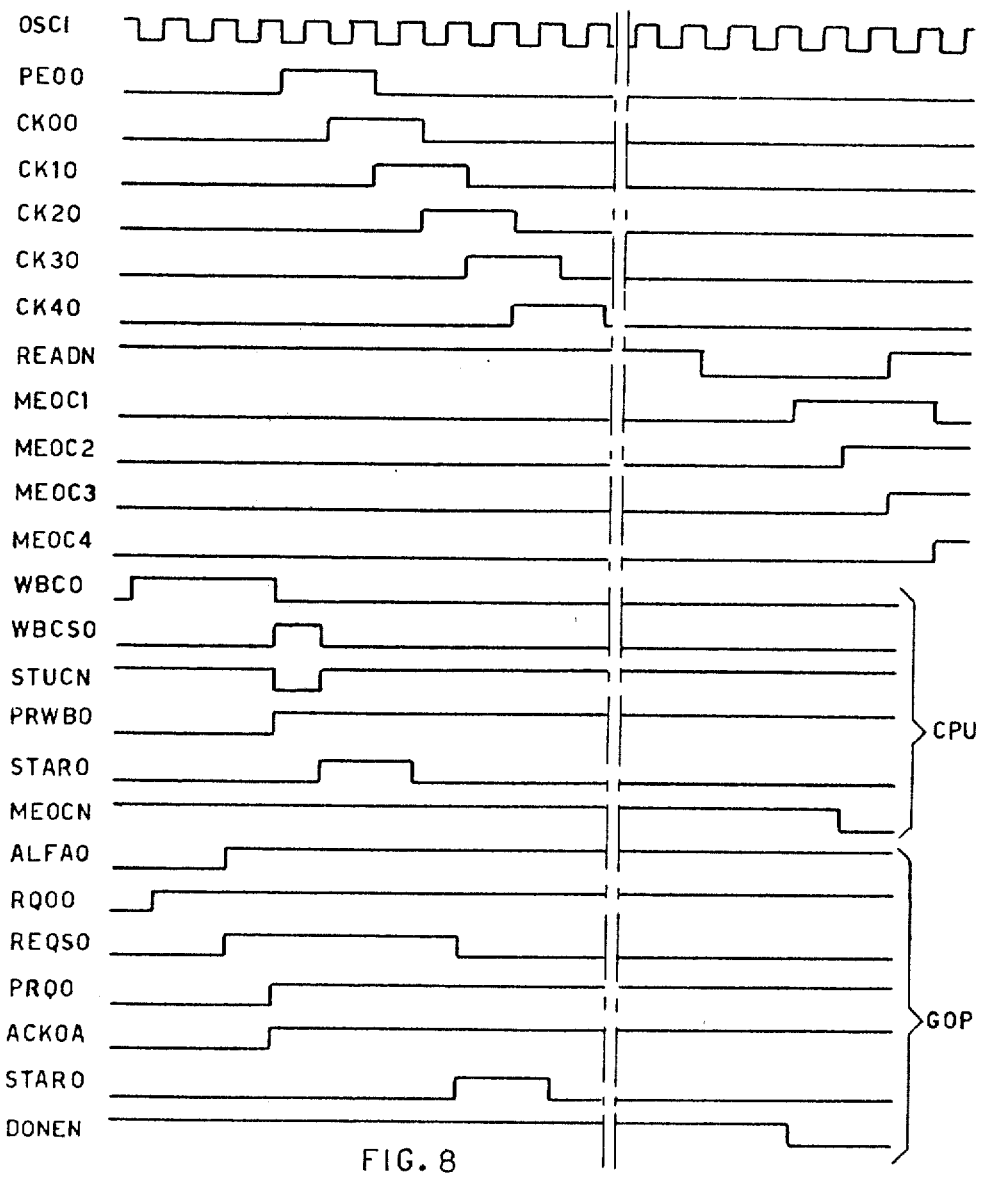
FIG. 8

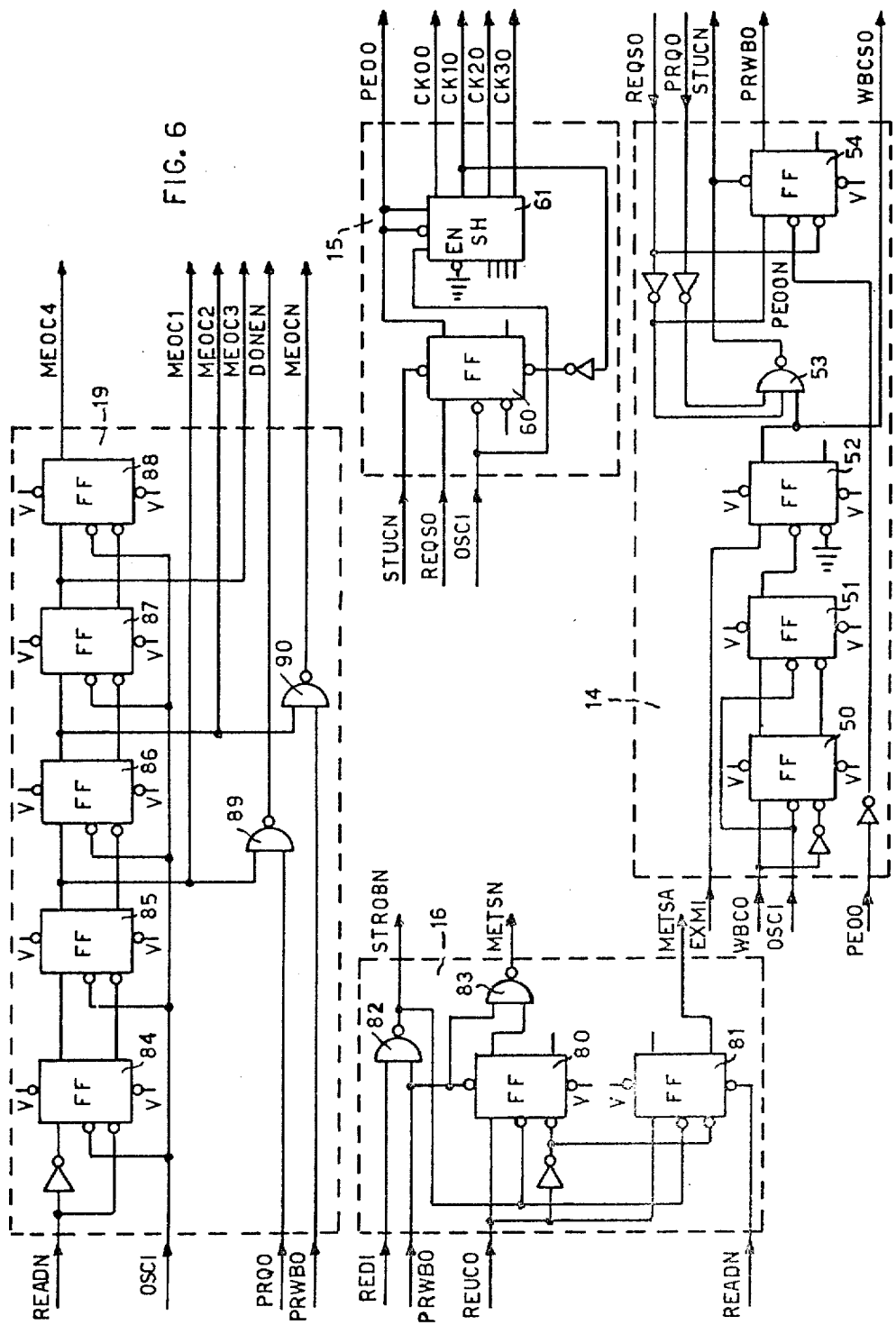

DIRECT MEMORY ACCESS CONTROL DEVICE

BACKGROUND OF THE INVENTION

The present invention relates to a computer comprising a central processor, a memory for storing information connected to the processor and to at least one controller for a peripheral unit, and a logic unit for control of the memory. Computers are known wherein one or more peripheral unit controllers can access the information contained in the memory singly and directly without engaging the central processor; such access is commonly called DMA (direct memory access). According to the DMA operation, the concerned peripheral unit interrupts the addressing operations of the central processor, replacing the processor in accessing the memory. This procedure entails a delay in the execution of the program of the central processor inasmuch as simultaneous requests for access by the peripheral unit controller and the central processor are resolved sequentially.

SUMMARY OF THE INVENTION

The object of the present invention is to make this type of operation faster by obviating the serious drawback of the arrest of the central processor during the execution of one or more DMA cycles.

The problem is solved by considering that the information contained in memory can be differentiated as information of exclusive utility for the central processor and as information of common utility for the central processor and for the peripheral units. It follows therefrom that in those cases in which the central processor uses only its own exclusive information there would not be any interference between the possible needs of the peripheral units and the needs of the central processor.

The invention is therefore characterized by a division. According to the ivention, there is now provided a computer comprising a memory divided into two zones, the first accessible exclusively by the central processor and the second accessible both by the central processor and by the peripheral unit controllers, and by a logic unit for controlling the access cycles and for synchronizing access by a peripheral unit controller to the second memory zone with access by the central processor to the first zone, whereby the two accesses take place simultaneously. More precisely, a request by a peripheral controller is delayed so as to synchronize the beginning of its access cycle with the beginning of an access cycle requested by the central processor and addressed to the first memory zone. A request for access by the central processor addressed to the second memory zone is satisfied only at the end of any possible accesses in progress by the peripheral controllers.

A detailed description of a preferred embodiment of the arrangement according to the invention will now be given with reference to the accompanying drawings.

BRIEF DESCRIPTION OF THE DRAWINGS

FIG. 2 is a flow diagram of the sequence of the various operations;

FIG. 3 shows the circuit details of blocks 8 and 9 contained in FIG. 1;

FIG. 4 (comprising FIGS. 4a, 4b and 4c) shows the possibility of division of the memory into two zones;

FIG. 5 shows the switching action of block 9 of FIG. 1;

FIG. 6 shows the circuit details of blocks 14, 15, 16 and 19 of FIG. 2;

FIG. 8 shows the timing of the principal signals concerning the logic circuits described.

DETAILED DESCRIPTION OF THE PREFERRED EMBODIMENT

Figure 1:
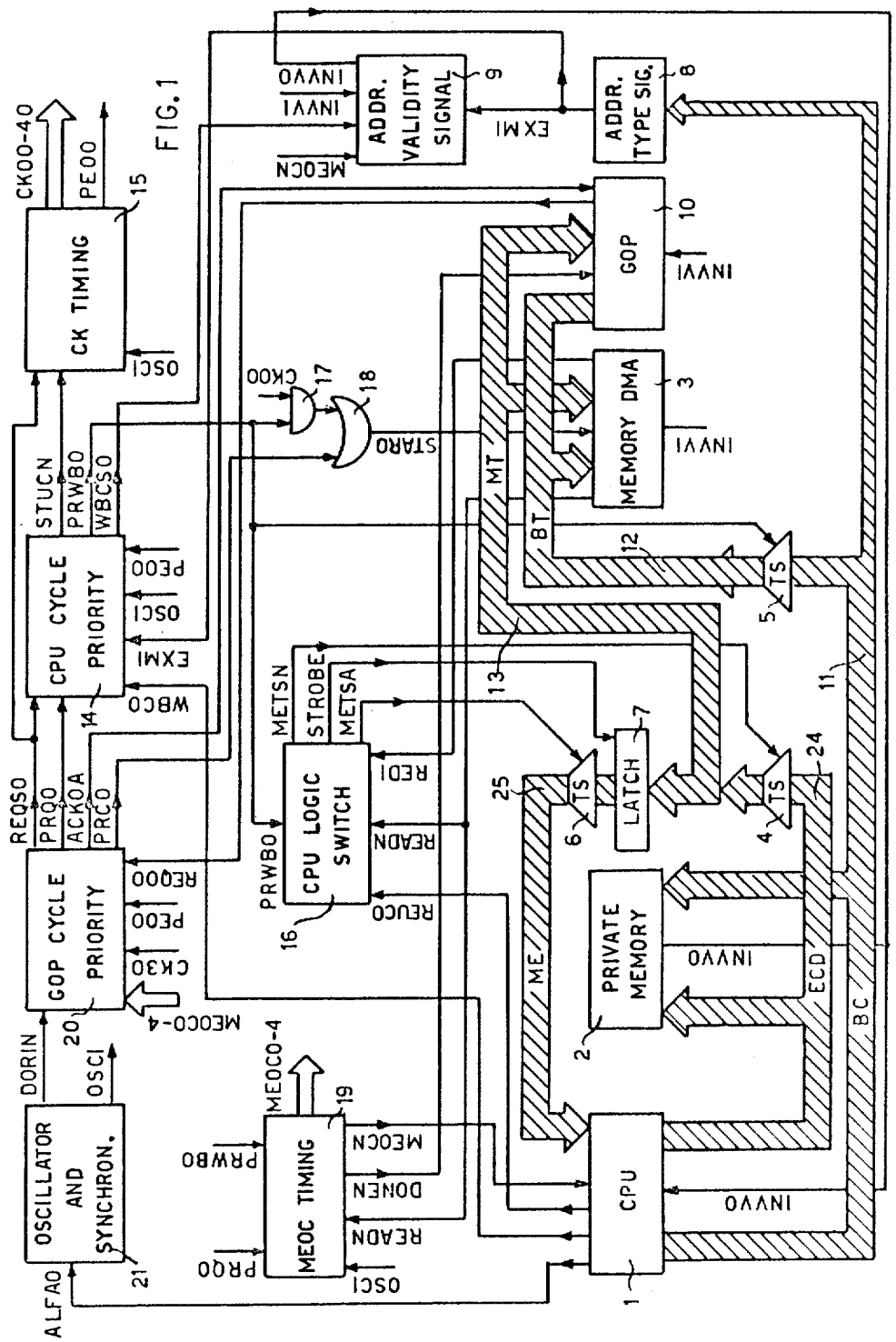
FIG. 1 shows the general logic diagram of the computer according to the invention.

The arrangement of FIG. 1 comprises: A central processor 1 hereinafter briefly called "the CPU"; a first memory zone 2 accessed exclusively by the central processor and hereinafter called "the private memory"; a second memory zone 3 with common access and hereinafter called "the DMA memory"; three three-state logic circuits 4, 5 and 6 hereinafter called "tristate circuits" which, according to the logical level of the command signal, behave as short circuits or as open circuits for the communication channels in which they are connected and therefore function as physical switches for the channels; a storage device 7, hereinafter called "latch", which is enabled to receive input data by a logical signal, which data will be permanently present at the output until a fresh enabling signal arrives; two logic circuits 8 and 9 for signalling the type and validity of the addressing; an address channel consisting of a first part 11 called BC and a second part 12 called BT; a bidirectional channel 13, called MT, for the communication of data from or for the memory and connected at two monodirectional channels 24 and 25 called ME and ECD, respectively; a block 10 indicating a plurality of peripheral unit controllers called GOPs; two logic circuits 14 and 20 adapted to allocate the cycles of access to the DMA memory 3 to the CPU 1 or to the GOPs 10, respectively; a logic circuit 15 adapted to generate beginning-of-cycle timing signals; a logic circuit 16, called "the CPU logic switch", which is adapted to enable selectively the connections of the channels ME, ECD and BC with the channels BT and MT which concern the DMA memory 3; two logic gates 17 and 18; a logic circuit 19 adapted to generate end-of-cycle timing signals; and an oscillating and synchronizing circuit 21.

It is pointed out that in FIGS. 1, 3, 4, 5, 6 and 8 all the signals whose names end in a vowel are understood to be active at high logical level, while those ending with the letter "N" are active at low level.

Operation of the arrangement of FIG. 1 takes place in the following manner.

When the CPU makes a request for access to memory, it emits the signal WBCO. This access by the central processor may concern the private memory 2, in which case it will be called "ALFA access" for short, or it may concern the DMA memory 3, in which case it will be called "BETA access". Access by the CPU 1 to the private memory 2, i.e. an ALFA access, requires no particular enable signal and is never delayed; a BETA access by the CPU, on the other hand, requires suitable enabling or inhibiting operations at the tristate circuits 4, 5 and 6 and at the latch 7 to be effected. The logic circuit 14 provides for the handling of a BETA access. At the inputs of the circuit 14 there are the following signals:

WBCO indicates a general request for access (writing or reading) by the CPU 1;

EXMI specifies whether the request for access is of BETA type;

PRQO indicates that the DMA memory is currently engaged by the GOPs 10;

REQSO indicates that there is a request by the GOPs 10. At the outputs:

PRWBO indicates allocation of the cycle of access to the DMA memory 3 to the CPU 1;

STUCN indicates the presence of a request for access to the DMA memory 3 by the CPU 1.

When the four input signals WBCO, EXMI, PRQO and REQSO indicate that a request for access by the CPU 1 to the DMA memory 3 and that the GOPs 10 are not, at present, accessing the same memory, the circuit 14 activates the output signals PRWBO and STUCN.

The signal STUCN has the function principally of enabling the timing circuit 15 to generate timing signals PEOO and CKOO-40.

The signal PRWBO has three functions. The first is to generate the signal STARO for enabling the DMA memory: the signal STARO is generated by the OR gate 18, which has as input the output of the AND gate 17 and the signal PRCO; the AND gate 17 has the signals CKOO and PRWBO as input. The second function of the signal PRWBO is to enable the tristate circuit 5. In this way the channel BT 12 is connected to the channel BC 11 and the CPU 1 can address the DMA memory 3. The third function is to command the logic circuit 16. The logic circuit 16 organizes the transmission of the data in both directions between the CPU 1 and the DMA memory 3.

In addition to the signal PRWBO to which reference has just been made, we have the following signals as input to the circuit 16:

REUCO specifies whether access by the CPU 1 is for reading or writing in memory;

REDI signals that the data read in the DMA memory 3 is ready on the channel MT 13;

READN signals the end of a cycle of access to the DMA memory 3.

As output we have the signals METSA, STROBN and METSN, which enable the tristate circuit 6, the latch 7 and the tristate circuit 4, respectively.

During a writing operation of the CPU 1 in the DMA memory 3, the tristate circuit 4 remains constantly enabled. During a reading operation, the tristate circuit 6 remains constantly enabled, while the latch 7 is enabled whenever the data in the DMA memory 3 is ready to be read.

When the access cycle is ended, the DMA memory 3 generates the end-of-access signal READN. The end-of-access signal READN enables the logic circuit 19 to generate the successive end-of-cycle timing signals MEOCO-4 and the signals MEOCN and DONEN. The signals MEOCN and DONEN indicate the end of the access cycle to the CPU 1 and the GOPs 10, respectively.

So far, the case of access by the CPU 1 to the DMA memory 3 has been seen. It is desired in particular to bring into evidence how this access is always possible if requests for access by the GOPs 10 are not present, since requests of the GOPs 10 have priority over the requests made by the CPU 1.

Let us suppose that one or more GOPs 10 simultaneously make a request for access to the DMA memory 3.

The logical OR of these requests for access is sent as input to the logic circuit 20 by means of the signal REQOO. The other inputs of the logic circuit 20 are constituted by the following details:

CKOO-40 and MEOCO-4 are suitable beginning-of-cycle and end-of-cycle timing signals adapted to condition the logical operations of the circuit;

DORIN is a signal indicating the beginning of an ALFA access by the CPU 1 to the private memory 2. As output we have the following signals:

REQSO indicates that the GOPs 10 have made a request;

PRQO indicates that the access cycle has been allocated to the request made by one of the GOPs 10;

PRCO corresponds to the signal PRQO synchronized with timing signals and principally has the function of enabling the DMA memory 3 through the logical OR gate 18;

ACKOA is the signal which enables the GOPs 10 to address the DMA memory 3 in the event of acceptance of the request.

The circuit 20 has the function of synchronizing access to the DMA memory 3 by the GOPs 10 with an ALFA access by the CPU 1 to the private memory 2. This circuit suitably delays the beginning of the cycle of access by the GOPs 10 so as to superpose the two cycles.

Another feature of the logic circuit 20 is that it synchronizes only the first request REQUOO with the beginning of an access of ALFA type, while following requests are accepted immediately, so that they are met without delays and in a sequential manner. In the most general case an access by the GOPs 10 to the memory 3 is therefore a group of several sequential accesses.

The logic circuit 21 comprises a quartz oscillator which generates the synchronism signal OSCI. The signal OSCI is used by the above-described logic circuits 14, 16 and 19. The logic circuit 21 moreover generates the signal DORIN whenever the signal ALFAO indicates the beginning of an access to the private memory 2. Explanation of the circuits 8 and 9 and explanation of those signals of FIG. 1 which have not yet been described will be postponed to the detailed examination to follow.

A brief synthesis of operation will now be given with reference to the flow diagram of FIG. 2. When no request coming from the GOPs 10 is present, a possible request of BETA type by the CPU 1 is followed by access to the DMA memory 3 (blocks 30, 36, 35). On the other hand, when a request by the GOPs 10 (block 30) occurs, it is delayed until the CPU 1 terminates a possible access of BETA type to the DMA memory 3 (block 31). At this point the GOP 10 can access the DMA memory 3 in synchronism with an access of the CPU 1 to the private memory 2 (blocks 32 and 33).

Access requested by a GOP 10 has priority over a BETA access requested by the CPU 1. If, at the end of an ALFA access by the CPU 1 to the private memory 2, the memory 3 is free, an immediate BETA access will follow. If, on the other hand, the DMA memory 3 is engaged by the GOPs 10, the request (BETA) is stored and allowed only on exhaustion of the access cycles done by GOPs 10 (blocks 34, 37, 38 and 35).

FIG. 3 shows in detail the circuit construction of the blocks 8 and 9 of FIG. 1. The circuit 8 serves to program the capacity and the location of the two zones, called the private memory 2 and the DMA memory 3, which we divided the memory into. The circuit 8 has as input the five most significant bits present on the address channel BC 11 of the CPU 1 (see FIG. 1). The output signal EXMI indicates by a high logical level that the address presented on the channel BC 11 belongs to the private memory 2, while a low logical level indicates that it belongs to the DMA memory 3. The circuit 8 comprises a comparison circuit 40 adapted to compare the configuration composed of the signals BC11-14 and BX15 with an equal number of signals C11-15.

The output AMIBO indicates by a high or low logical level, respectively, whether the configuration formed by the signals BC11-14 and BX15 represents a number smaller or greater than the comparison configuration C11-15.

The circuit 41 is simply constituted by eleven movable connectors P1-11. These connectors give the option of connecting or not connecting each of the inputs to the corresponding output. This option is essential for programming the locations and capacities of the zones 2 and 3 of the memory. Referring to the following Table 1 and to FIG. 4, three modes of programming are distinguished.

consequence is that the connections of the connectors P1-5 actually made bring the inputs C11-15 of the circuit 40 to low logical level, defining in this way the comparison configuration. Those connections P1-5 not made (N in Table 1) define a corresponding signal C11-15 of high logical level.

It is explained at this point that BC11-15 represents a number greater than C11-15 whenever the address present on the channel BC 11 is a number greater than the configuration C15-C14-C13-C12-C11-1-1-1-1-1-1-1-1-1-1-1. In this case the signal EXMI is at high logical level and thus indicates that the address relates to the private memory 2. In the opposite case (address lower than the foregoing configuration), the signal EXMI is at low logical level and indicates that the address relates to the DMA memory 3 (see FIG. 4a).

Mode B differs from mode A only in the fact that the connection P7 is made instead of the connection P6.

Table 1

| CONNECTIONS P1-5 | | | | | MODE A CONNECTIONS P6-11 | | | | | | | MODE B CONNECTIONS P6-11 | | | | | | | MODE C CONNECTIONS P6-11 | | | | | | |
|---|---|---|---|---|---|---|---|---|---|---|---|---|---|---|---|---|---|---|---|---|---|---|---|---|
| | | | | | 6 C | 7 N | 8 N | 9 C | 10 C | 11 N | | 6 N | 7 C | 8 N | 9 C | 10 C | 11 N | | 6 N | 7 C | 8 C | 9 N | 10 N | 11 C |
| | | | | | ADDRESSES | | | | | | | ADDRESSES | | | | | | | ADDRESSES | | | | | |
| 1 | 2 | 3 | 4 | 5 | FROM | | | TO | | | | FROM | | | TO | | | | FROM | | | TO | | |
| N | C | C | C | C | 0000 | | | 07FF | | | | 0800 | | | FFFF | | | | 0800 | | | 8000 | | |
| C | N | C | C | C | 0000 | | | 0FFF | | | | 1000 | | | FFFF | | | | 1000 | | | 8000 | | |
| N | N | C | C | C | 0000 | | | 17FF | | | | 1800 | | | FFFF | | | | 1800 | | | 8000 | | |
| C | C | N | C | C | 0000 | | | 1FFF | | | | 2000 | | | FFFF | | | | 2000 | | | 8000 | | |
| N | C | N | C | C | 0000 | | | 27FF | | | | 2800 | | | FFFF | | | | 2800 | | | 8000 | | |
| C | N | N | C | C | 0000 | | | 2FFF | | | | 3000 | | | FFFF | | | | 3000 | | | 8000 | | |
| N | N | N | C | C | 0000 | | | 37FF | | | | 3800 | | | FFFF | | | | 3800 | | | 8000 | | |
| C | C | C | N | C | 0000 | | | 3FFF | | | | 4000 | | | FFFF | | | | 4000 | | | 8000 | | |
| N | C | C | N | C | 0000 | | | 47FF | | | | 4800 | | | FFFF | | | | 4800 | | | 8000 | | |
| C | N | C | N | C | 0000 | | | 4FFF | | | | 5000 | | | FFFF | | | | 5000 | | | 8000 | | |
| N | N | C | N | C | 0000 | | | 57FF | | | | 5800 | | | FFFF | | | | 5800 | | | 8000 | | |
| C | C | N | N | C | 0000 | | | 5FFF | | | | 6000 | | | FFFF | | | | 6000 | | | 8000 | | |
| N | C | N | N | C | 0000 | | | 67FF | | | | 6800 | | | FFFF | | | | 6800 | | | 8000 | | |
| C | N | N | N | C | 0000 | | | 6FFF | | | | 7000 | | | FFFF | | | | 7000 | | | 8000 | | |
| N | N | N | N | C | 0000 | | | 77FF | | | | 7800 | | | FFFF | | | | 7800 | | | 8000 | | |
| C | C | C | C | N | 0000 | | | 7FFF | | | | 8000 | | | FFFF | | | | | | | | | |
| N | C | C | C | N | 0000 | | | 87FF | | | | 8800 | | | FFFF | | | | | | | | | |
| C | N | C | C | N | 0000 | | | 8FFF | | | | 9000 | | | FFFF | | | | | | | | | |
| N | N | C | C | N | 0000 | | | 97FF | | | | 9800 | | | FFFF | | | | | | | | | |
| C | C | N | C | N | 0000 | | | 9FFF | | | | A000 | | | FFFF | | | | | | | | | |
| N | C | N | C | N | 0000 | | | A7FF | | | | A800 | | | FFFF | | | | | | | | | |
| C | N | N | C | N | 0000 | | | AFFF | | | | B000 | | | FFFF | | | | | | | | | |
| N | N | N | C | N | 0000 | | | B7FF | | | | B800 | | | FFFF | | | | | | | | | |
| C | C | C | N | N | 0000 | | | BFFF | | | | C000 | | | FFFF | | | | | | | | | |
| N | C | C | N | N | 0000 | | | C7FF | | | | C800 | | | FFFF | | | | | | | | | |
| C | N | C | N | N | 0000 | | | CFFF | | | | D000 | | | FFFF | | | | | | | | | |
| N | N | C | N | N | 0000 | | | D7FF | | | | D800 | | | FFFF | | | | | | | | | |
| C | C | N | N | N | 0000 | | | DFFF | | | | E000 | | | FFFF | | | | | | | | | |
| N | C | N | N | N | 0000 | | | E7FF | | | | E800 | | | FFFF | | | | | | | | | |
| C | N | N | N | N | 0000 | | | EFFF | | | | F000 | | | FFFF | | | | | | | | | |
| N | N | N | N | N | 0000 | | | F7FF | | | | F800 | | | FFFF | | | | | | | | | |

It is to be noted that in Table 1 the connections to be made in positions P1-11 of the circuit 41 of FIG. 3 are indicated by a "C", while the connections not to be made are indicated by an "N". For each arrangement of the configurations P1-11 there are given in correspondence therewith the various groups of addresses (in hexadecimal notation) belonging to the DMA memory 3. It can be observed in particular how the capacity of the DMA memory 3 can be incremented by modules having 2048 (2K) words.

In the first mode, mode A, the connections P6, P9 and P10 are made, while the connections P1-5 program the capacity of the DMA memory 3. The connection P6 puts EXMI equal to the negated form of AMIBO. The connection P9 puts B×15=BC15. The connection P10 is a connection with a constantly low logical level. The The consequence is that, the other conditions being equal, the signal EXMI always gives an opposite indication to that of mode A. The two memory locations are therefore inverted with respect to the previous case (see FIG. 4b).

In mode C the connections P7, P8 and P11 are permanently made. The result is that as long as the address presented on the channel BC 11 is less than 1000000000000000 it has the most significant bit BC15 at low logical level and the circuit 8 behaves as in case B. In fact, when the bit BC15 is at low logical level, the output signal EXMI indicates that the address present on the channel BC 11 relates to the private memory 2, in the case where the address is lower than the comparison address. On the other hand, in the case where the address is higher, the output signal EXMI indicates that the address relates to the DMA memory 3.

When the address presented on the channel BC 11 is equal to or greater than 1000000000000000, the most significant bit BC15 is obviously at high logical level. This imposes a high logical level on the signal C15 (connection P11), so that the comparison circuit 40 interprets the address present on the channel BC 11 as belonging to the private memory zone 2; the consequence is the configuration of FIG. 4c. Table 1 specifies, also for mode C, the practical choice of the locations of the DMA memory 3 with the respective addresses.

The detailed description of the remaining blocks contained in FIG. 1 is prefaced by the information that the letter "V" present at the asynchronous inputs of a number of flip-flops of J-K type represents a fixed voltage adapted to permit asynchronous operation of the arrangement in some cases.

The logic circuit 9 has the function of allowing the signalling of a non-valid address to the CPU 1. As input to the logic circuit 9 (FIG. 3) we have the following signals with their respective significances:

EXMI indicates the type of access requested by the CPU 1;

MEOCN indicates the end of a cycle of access by the CPU 1;

WBCSO indicates a request for access of BETA type coming from the CPU 1;

INVVI, if low, indicates that the address being sought is present in the DMA memory 3.

The output INVVO has the function of indicating that the address being sought is present in the DMA memory 3 or in the private memory 2, according to the type of access. When access by the CPU 1 is addressed to the private memory 2, the signal EXMI activates the flip-flop 45, which is timed by the signal WBCSO. The flip-flop 45 then presents a high logical level as output and the output INVVO from the logical OR gate 46 will also be at high logical level. On the other hand, when access by the CPU 1 is addressed to the DMA memory 3, the output of the flip-flop 45 is at low logical level, while the signal MEOCN enables the logical AND gate 47; the output INVVO therefore simply copies the logical level of the signal INVVI.

The utility of the signal INVVO can be better understood by referring to FIG. 5, which shows a connecting system for the various memory blocks (making up the zones 2 and 3) which is useful for signalling to the CPU 1 or to the GOPs 10 that the address being sought is not contained in that zone of the memory. When the private memory 2 is concerned, the circuit 9 sends the conductor INVVO to a high logical level. This is represented by the connection of the switch 74 to the supply voltage of +5 volts (block 9). As can be seen from the drawing, the presence of the address being sought in one of the blocks 75, 76 of the private memory 2 can suitably command a transistor 70 or 71 and bring the conductor INVVO to low logical level. Only in the case in which the address being sought is not present in any block of the private memory 2 will the conductor INVVO continue to remain at high logical level, signalling the error in this way to the CPU 1.

When the DMA memory 3 is concerned, the circuit 9 acts so that on the conductor INVVO there appears the same logical level present on the conductor INVVI, effecting the closure of the switch 74.

Similarly to the case of access to the private memory 2, if the address is not present in either of the blocks 77, 78 of the DMA memory 3, the transistor 72 or 73 does not lower the logical voltage of the conductor INVVI and this signals "out of memory" to the CPU 1 by a high logical level.

A description will now be given of other blocks of FIG. 1, for which reference may be made to the timing diagrams of FIG. 8. As has already been said, the priority circuit 14 (FIG. 6) provides for storing requests for access of BETA type and for determining allocation of the access cycles to the CPU 1.

A general request for access WBCO by the CPU 1 is stored at the output of the flip-flop 52 by means of the delay flip-flops 50 and 51 only in the presence of the signal EXMI. This means that only when the request is directed to the DMA memory 3 (BETA access) does the signal WBCSO rise to high logical level.

If there are neither requests by a GOP 10, nor cycles to be allocated (signals REQ50 and PRQO at low logical level), and if the signal WBCSO is at high logical level, the signal STUCN issuing from the NAND gate 53 goes to low logical level, signalling in this way the validity of the request by the CPU 1.

These same conditions set the output of the flip-flop 54 in asynchronous manner, that is the signal PRWBO rises to high logical level and the cycle of access to the DMA memory 3 is allocated to the CPU 1. The signal WBCSO has only the duration of a period of the signal OSCI, and thus also STUCN (FIG. 8). After this interval, the signal STUCN will be at high logical level, so that the flip-flop 54 will function in synchronous manner. Because of this, the flip-flop 54 will reset itself and therefore the signal PRWBO will go to low logical level only in corrspondence with the signal PEOO and when REQSO at high logical level will indicate an accepted request coming from the GOPs 10.

The timing circuit 15 generates a group of signals PEOO and CKOO-30 out of phase in time whenever the signal REQSO or STUCN indicates that a request for access to the DMA memory 3 has been accepted.

When a request for access by the GOPs 10 is accepted, both REQSO and STUCN are at high logical level and therefore the consequence is that the flip-flo 60 operates in synchronous manner and its output PEOO is set.

The signal PEOO applied as input to the first stage of the shift register 61, which is commanded by the synchronism pulses OSCI, activates in succession, at each synchronism pulse, the signals CK00, CK10, CK20 and CK30 (FIG. 8). When the signal CK10 goes to high logical level, the flip-flop 60 is obviously reset (PE00=0). Owing to this, the signals CK00-30 will also return to low logical level.

When a request for access coming from the CPU 1 is accepted, both STUCN and REQSO are at low logical level, the flip-flop 60 operates in asynchronous manner and its output PEOO is set. Operation is therefore similar to the preceding case, that is the same waveforms are again generated.

The logical switching circuit 16 generates the signals necessary for selectively enabling the CPU 1 to read or write in the DMA memory 3. It will be remembered that the signals STROBN and METSA enable reading, while the signal METSN enables writing, and that if the input signal REUCO is at high logical level it indicates a writing access and if at low level it indicates a reading access. The signal PRWBO enables the NAND gates 82 and 83 in the case of access by the CPU 1. The signal REUCO commands the flip-flops 80 and 81 to activate selectively the signals MESNO and METSA. The signal STROBN appears only in the case of reading, that is when the memory is ready to transmit the data (signal REDI). At the end of the access, the flip-flop 80 is reset by the same signal REUCO, while the flip-flop 81 is reset by the signal READN of end of access to the DMA memory 3.

Figure 7:
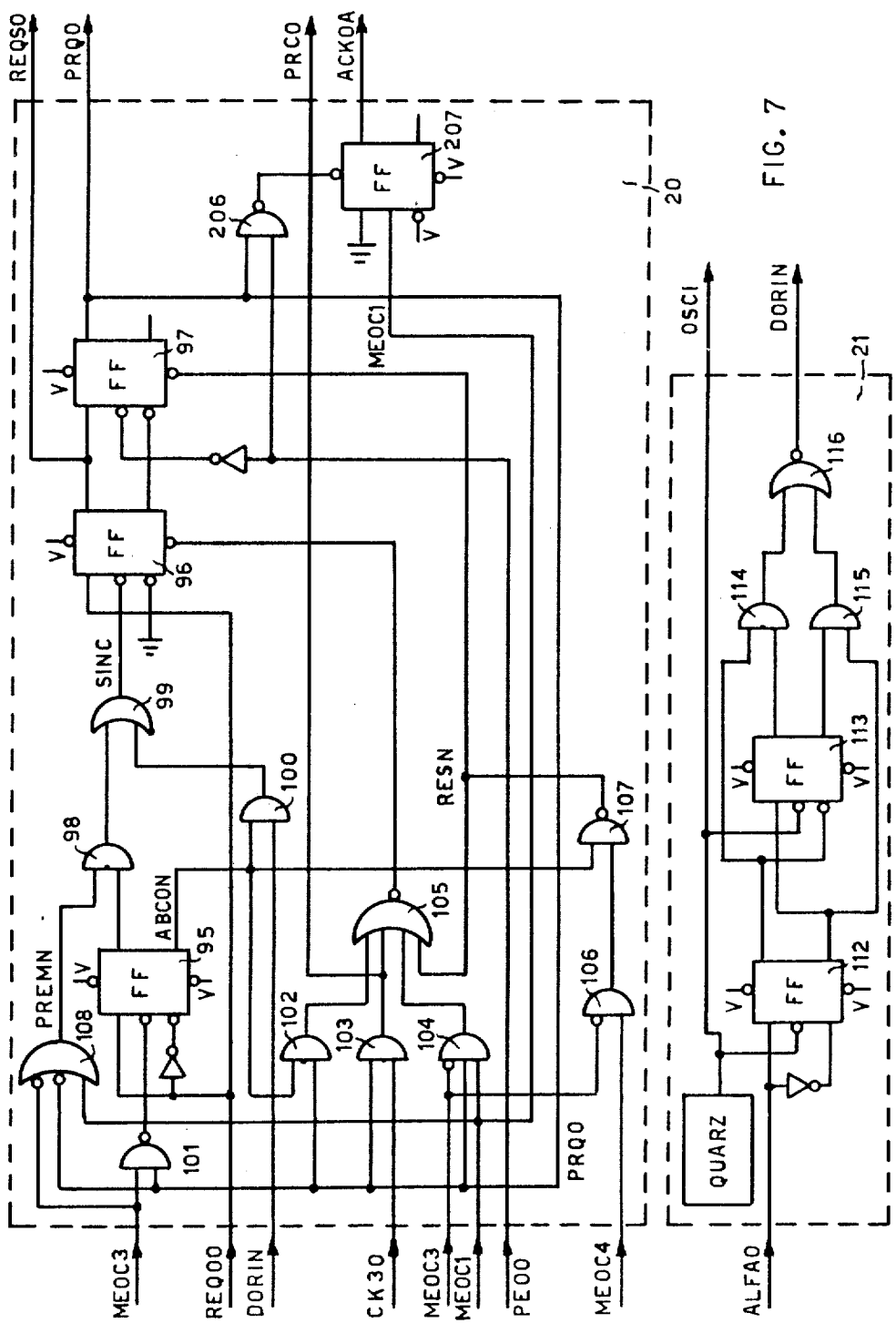
FIG. 7 shows the circuit details of the blocks 20 and 21 of FIG. 1.

The timing circuit 19 is composed of five flip-flops 84-88 synchronized by the signal OSCI. The signal READN of end of access to the DMA memory 3 is therefore shifted at each synchronism pulse to a following one of the flip-flops 84-88 and gives rise to the sequence of timings MEOC1-4 (see FIG. 8) every time an access to the DMA memory 3 is terminated. The NAND gates 89 and 90 are enabled by the signals PRQO and PRWBO, respectively. The signal DONEN at the output of the NAND gate 89 indicates to the GOPs 10 that the cycle of access to the DMA memory 3 is terminated, while the output signal MEOCN of the NAND gate 90 supplies the same indication to the CPU 1. As has already been said, the priority circuit 20 (FIG. 7) provides for storing and suitably synchronizing requests for access coming from the GOPs 10 (signal REQOO). As output there are generated the signals REQSO and PRQO of known significance, and the signal ACKOA which indicates acceptance of the request made to the GOPs 10, and finally the signal PRCO which enables the DMA memory 3 at the appropriate instant. When the GOPs 10 make a first request for access REQOO, the flip-flop 95 is not enabled by the NAND gate 101 and the signal REQOO therefore only concerns the flip-flop 96. As soon as a fresh access of ALFA type by the CPU 1 begins, the signal DORIN is enabled by ABCON by means of the AND gate 100 and generates through the OR gate 99 the timing signal SINC for the flip-flop 96. The signal REQSO at the output of the flip-flop 96 is therefore set at high logical level only in correspondence with the beginning of an access of ALFA type by the CPU 1 (signal DORIN).

If the signal REQSO is set, the flip-flop 97 also sets the signal PRQO (which indicates a cycle allocated to the to the GOPs) in correspondence with the beginning-of-cycle signal PEOO. Simultaneously, the signal PE00 and the signal PRQO (both at high logical level) set the flip-flop 107 by means of the NAND gate 106. In this way there is also activated the signal ACKOA enabling the GOPs to being the requested memory cycle.

The signal PRQO at high logical level is applied as input to the NAND gate 101 together with the timing signal MEOC 3. The flip-flop 95 is obviously enabled and will set itself on presence of requests REQO following the first. Owing to this, the signal SINC enabling the flip-flop 96 will be activated through the medium of the AND gate 98 and the OR gate 99 by the signal PREMN. The signal PREMN is generated by means of the OR gate 108 as a combination of the end-of-cycle signals MEOC 2 and MEOC 1 and the signal PRQO. The result of all this is that the first request by the GOPs 10 is enabled only at the beginning of an access of ALFA type, while following requests are enabled by the end-of-cycle signals of the preceding request, so that they are accepted sequentially without delays.

The AND gates 102, 103, 104 and the NOR gate 105 constitute a circuit adapted to enable or reset the flip-flop 96.

The signals PRQO, ABCON, CK30, MEOC1, MEOC3 and RESN, to which the last-mentioned signal reference will be made hereinafter, define in fact, according to their logical level, the conditions under which the flip-flop 96 must be enabled by means of the signal MASO to accept the input signals or must remain reset. This circuit meets the need to mask requests for access REQO under specific logico- temporal conditions.

The end-of-cycle signals MEOC5 and MEOC4 and the signal ABCON provide by means of the AND gate 106 and the NAND gate 107 for generating the end-of-cycle reset signal RESN used by the flip-flop 97 and by the NOR gate 105.

The circuit 21 comprises a quartz oscillator QUARZ which generates the synchronism signal OSCI withe a period of 50 nsec, and a circuit for generating the signal DORIN of beginning of access of ALFA type.

The flip-flop 112, synchronized by the signal OSCIO, is set when the signal ALFAO, indicating a request for access of ALFA type, goes to high logical level.

The output of the flip-flop 112 goes as input to the flip-flop 113 with crossed connections, so that it is clear that only when the signal ALFAO is activated the outputs of the AND gates 114 and 115 go high for the duration of a synchronism pulse OSCI and the signal DORIN is generated at the output of the NOR gate 116.

Let us see the characteristics of the arrangement of FIG. 1 in terms of times. Let AST be the time required by the GOPs 10 for carrying out an access or several sequential accesses to the DMA memory 3. Let TS be the total time available for superposing the cycles, that is the interval of time between the beginning of the ALFA access and the beginning of a BETA access by the CPU 1. In our embodiment the time TS=1100 ns. The time AST depends on the number of sequential accesses effected by the GOPs 10: in the case of a single access AST=900 ns. It follows from this that if the GOPs 10 effect one access only at a time, the condition AST<TS takes place, which condition represents a complete superposition of the accesses. On the other hand, if the GOPs 10 effect several accesses in sequence, that is the condition AST>TS, the cycle of the CPU 1 in progress will, on the other hand, be delayed by the time R1=AST=TS. Logically, a high number of fast peripherals will increase the probability of sequential accesses by the GOPs 10 and will progressively delay execution of the programs of the CPU, the total saving of a time equal to TS for each access or group of accesses allocated to the GOPs 10 remaining fixed.

Those skilled in the art will, however, know exactly how to adjust the number of extensions and applications to particular peripherals in relation to their speed in order to obtain the maximum advantage from the saving of time allowed by the present arrangement.

What we claim is:

1. A computer comprising a central processor, at least one peripheral unit controller, a memory connected to said central processor and to said controller for storing data and instructions, said processor and said controller being selectively conditionable for executing a correspondent input-output access cycle to said memory for storing or reading out said data and instructions, and a controlling logic unit for so conditioning said processor and said controller, wherein the improvement comprises: first access control means conditionable by said central processor for causing a first zone of said memory to be accessed soley by said control processor, second access control means conditionable by said logic unit for causing a second zone of said memory to be accessed by said controller and said central processor separately with respect to the access to said first zone selectively by said processor, and synchronizing means included in said logic unit and conditioned by said second access control means, when said controller is accessed for synchronizing the access of said controller to said second zone with the access of said processor to said first zone as to be effected simultaneously.

2. A computer according to claim 1 wherein said first access control means comprises a first communication channel connecting said processor to said first memory zone and said second access control means comprises a second communication channel connecting the processor to said second memory zone and a third communication channel connecting the controller to said second memory zone, said logic unit comprising means responsive to a signal of said processor indicating its access to said first memory zone and to a signal of said controller indicating access to said second memory zone for conditioning said synchronizing means.

3. A computer according to claim 1 further comprising request means connected to said peripheral unit controller for producing a request signal which is transmitted to said logic unit to represent the request of said controller for an access cycle to said second memory zone, and priority means included in said logic unit and controlled by said request signal for inhibiting the access to said second memory zone by said processor during the access cycle to said second zone by said controller.

4. A computer according to claim 3, wherein said controlling logic unit comprises means for delaying said access by the peripheral unit controller in such manner as to synchronise the beginning of said access by the controller to the second memory zone with the beginning of an access by the central processor to said first memory zone.

5. A computer according to claim 4 including a plurality of peripheral unit controllers, said request means being connected to all said controllers, said priority means comprising a circuit adapted to distinguish a first of said requests of access from following requests consecutively coming from said controllers during the time that said second memory zone is accessed by one of said controllers, and deactivating means responsive to said circuit for deactivating said delay means whenever said following requests are detected, whereby only the cycle of access requested by said first request of said controllers is delayed by said delaying means, the cycle of access requested by said following requests being allowed by said logic unit consecutively to said first cycle.

6. A computer according to claim 8, further comprising manually settable means for setting the capacity and location of the said first zone and said second zone of the memory, and means for indicating to which of said zones the request for access by the central processor and by said peripheral controller is referred.

7. A computer according to claim 6, comprising first and second addressing means associated to said first and said second memory zone, a first and a second circuit for recognizing when an address generated by said first and second addressing means are not found in the respective memory zone, and connecting means included in said logic unit and controlled by said indicating means for selectively connecting said recognizing circuits to said processors to prevent the operations of said access control means when the memory zone for which access is requested is not consistent with the generated address.

* * * * *